(12) United States Patent
Paauwe

(10) Patent No.: US 7,316,402 B2
(45) Date of Patent: Jan. 8, 2008

(54) SEGMENTED COMPONENT SEAL

(75) Inventor: Comeil Paauwe, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/371,882

(22) Filed: Mar. 9, 2006

(65) Prior Publication Data
US 2007/0210536 A1    Sep. 13, 2007

(51) Int. Cl.
F16J 15/08    (2006.01)
F16J 15/48    (2006.01)

(52) U.S. Cl. .................. 277/641; 277/644; 277/647; 277/654

(58) Field of Classification Search ............. 277/641, 277/644, 647, 654
See application file for complete search history.

(56) References Cited

U.S. PATENT DOCUMENTS

| 4,311,432 | A |   | 1/1982  | Kildea |
|-----------|---|---|---------|--------|
| 4,537,024 | A |   | 8/1985  | Grosjean |
| 4,759,555 | A | * | 7/1988  | Halling .................. 277/631 |
| 5,125,796 | A |   | 6/1992  | Cromer |
| 5,154,577 | A |   | 10/1992 | Kellock et al. |
| 5,435,576 | A |   | 7/1995  | Rode |
| 5,709,530 | A |   | 1/1998  | Cahill et al. |
| 5,716,052 | A | * | 2/1998  | Swensen et al. ............. 277/647 |
| 5,865,600 | A | * | 2/1999  | Mori et al. ............. 416/198 A |
| 6,193,240 | B1 | * | 2/2001  | Johnson et al. ............. 277/643 |
| 6,199,871 | B1 | * | 3/2001  | Lampes ...................... 277/614 |
| 6,237,921 | B1 | * | 5/2001  | Liotta et al. ................. 277/630 |
| 6,318,732 | B1 | * | 11/2001 | Hoyes et al. ............... 277/593 |
| 6,431,825 | B1 | * | 8/2002  | McLean ..................... 415/135 |
| 6,916,024 | B2 | * | 7/2005  | Hanashima et al. ........ 277/602 |
| 6,968,615 | B1 | * | 11/2005 | More et al. ................ 29/888.3 |
| 2003/0122325 | A1 | * | 7/2003  | Aksit et al. ................. 277/647 |
| 2004/0179937 | A1 |   | 9/2004  | Kreis et al. |
| 2004/0239053 | A1 | * | 12/2004 | Rowe et al. ................ 277/650 |

* cited by examiner

Primary Examiner—Alison K Pickard
(74) Attorney, Agent, or Firm—Colin L. Cini

(57) ABSTRACT

A seal for restricting leakage of a fluid from a first chamber, through a gap between two components, to a second chamber is provided. A slot is formed in each of the two components. The slots face one another and are open to the gap. Each slot contains a longitudinal axis, an upstream surface proximate the first chamber and a downstream surface proximate the-second chamber. Disposed in the slots and spanning the gap is a bridging assembly comprising first and second bridging elements. Each bridging element contains a sectional profile, transverse to the longitudinal slot axis, that is wave shaped. The bridging elements further contain a crest portion disposed between two trough portions with the crest portions nesting together. When installed, the trough portions are disposed in the slots and the crest portions are disposed in the gap.

14 Claims, 4 Drawing Sheets

SEGMENTED COMPONENT SEAL

BACKGROUND OF THE INVENTION (1) Field of the Invention

The invention relates to gas turbine engine components in general, and specifically to a seal for preventing leakage of high pressure air or other fluids between segmented components used in such engines.

(2) Description of the Related Art

As illustrated in FIG. 1, a gas turbine engine 10 comprises one or more forward compressor sections 12, a central combustor section 14 and one or more rearward turbine sections 16. The engine 10 operates by compressing ambient air 18 with the compressors 12, adding fuel upstream of the combustor 14 and burning a fuel-air mixture 20 in the combustor 14. High temperature combustion gases 22 are directed axially rearward from the combustor 14, through an annular duct 24 disposed in the turbines 16. The combustion gases 22 interact with one or more turbine rotors 26, outer portions of which are disposed in the duct 24. The turbine rotors 26 are coupled to compressor rotors 28 via concentric shafts 30 rotating about a central longitudinal axis 32 of the engine 10. Gas turbine engines are known to power aircraft, ships and electrical generators.

Extending into the annular gas duct 24 are alternating circumferential stages of rotating blades 34 and stationary vanes 36. The stationary vanes 36 extend radially inwardly from a casing structure 38 surrounding the turbines 16. To prevent oxidation of the vanes 36 and other stationary components due to the hot combustion gases 22, low temperature compressor air 40 is directed radially inboard and outboard of the duct 24 to the components. The compressor air 40 is maintained at a higher pressure than the combustion gas 22 pressure, to ensure a continuous supply of compressor air 40 reaches the components.

Because stationary components such as vanes, shrouds, supports and the like are subject to extreme temperature gradients, they can develop cracks due to thermal mechanical fatigue (TMF). To reduce the occurrence of TMF induced cracking, these components are typically installed in semi annular segments distributed circumferentially about the engine's longitudinal axis. The segmented components are uncoupled from one another, thus allowing them to expand and contract independently. In addition to their improved TMF resistance, segmented components are also less expensive to repair and/or replace after extended use.

Despite the aforementioned benefits, axial and radial gaps must be included between adjacent components to allow for thermal expansion. These gaps require sealing to ensure an adequate pressure differential exists between the compressor air and the combustion gas. Maintaining a compressor air pressure that is greater than the combustion gas pressure ensures a continuous flow of compressor air and prevents backflow of the combustion gas. Excessive leakage of the compressor air may cause premature oxidation of the components and can increase the engine's fuel burn. With jet fuel accounting for up to sixty five percent of the operating expense of a commercial airliner, any reduction in fuel burn is beneficial.

Various seal configurations are known to restrict leakage of a pressurized fluid through a gap between two components. Feather seals are the type most commonly used between segmented components in gas turbine engines. Feather seals comprise a slot in the adjacent components that are open to the gap, and a bridging element disposed in the slots, spanning across the gap.

Flat bridging elements, such as those disclosed in U.S. Pat. No. 5,154,577 to Kellock, et al, are fit into the adjoining slots. They depend on the higher-pressure compressor air to seat the bridging elements against the slots to form the seal. Assembly damage, misaligned slots, slot surface finish and low compressor air pressure may negatively affect the performance of flat bridging elements.

Resilient bridging elements, such as those disclosed in U.S. Pat. No. 4,537,024 to Grosjean, are press fit into the adjoining slots. They rely on the contact pressure between the bridging element and the slot being greater than the compressor air pressure to form the seal. However, the single loop ends of the bridging elements offer limited contact pressure with the slot and are subject to compression about their minor axis.

Although misaligned slots, slot surface finish and low compressor air pressure have a less negative impact on resilient bridging elements, feather seal improvement is still needed.

BRIEF SUMMARY OF THE INVENTION

In accordance with the present invention, there is provided a seal for restricting leakage of a high-pressure fluid from a first chamber, through a gap between two adjoining components, to a second chamber.

According to an embodiment of the seal, a slot is formed in each of the two components. The slots face one another and are open to the gap. Each slot contains a longitudinal axis, an upstream surface proximate the first chamber and a downstream surface proximate the second chamber. Disposed in the slots and bridging the gap are first and second bridging elements. Each bridging element contains a sectional profile, transverse to the longitudinal slot axis, that is wave shaped. Each bridging element further contains a crest portion disposed between two trough portions and the crest portions nest together. The bridging elements span the gap between the two components, the trough portions are disposed in the slots and the crest portions are disposed in the gap.

A primary feature of the seal is the wave shaped profile of the resilient bridging elements. The wave shape increases the contact force between the ends of the bridging element and the slot surfaces.

A primary advantage of the seal is an increased leakage restriction over conventional seals with minimum increase in weight and cost.

Other details of the seal according to the present invention, as well as other objects and advantages attendant thereto, are set forth in the following detailed description and the accompanying drawings wherein like reference numerals depict like elements.

DETAILED DESCRIPTION OF THE INVENTION

Figure 2:
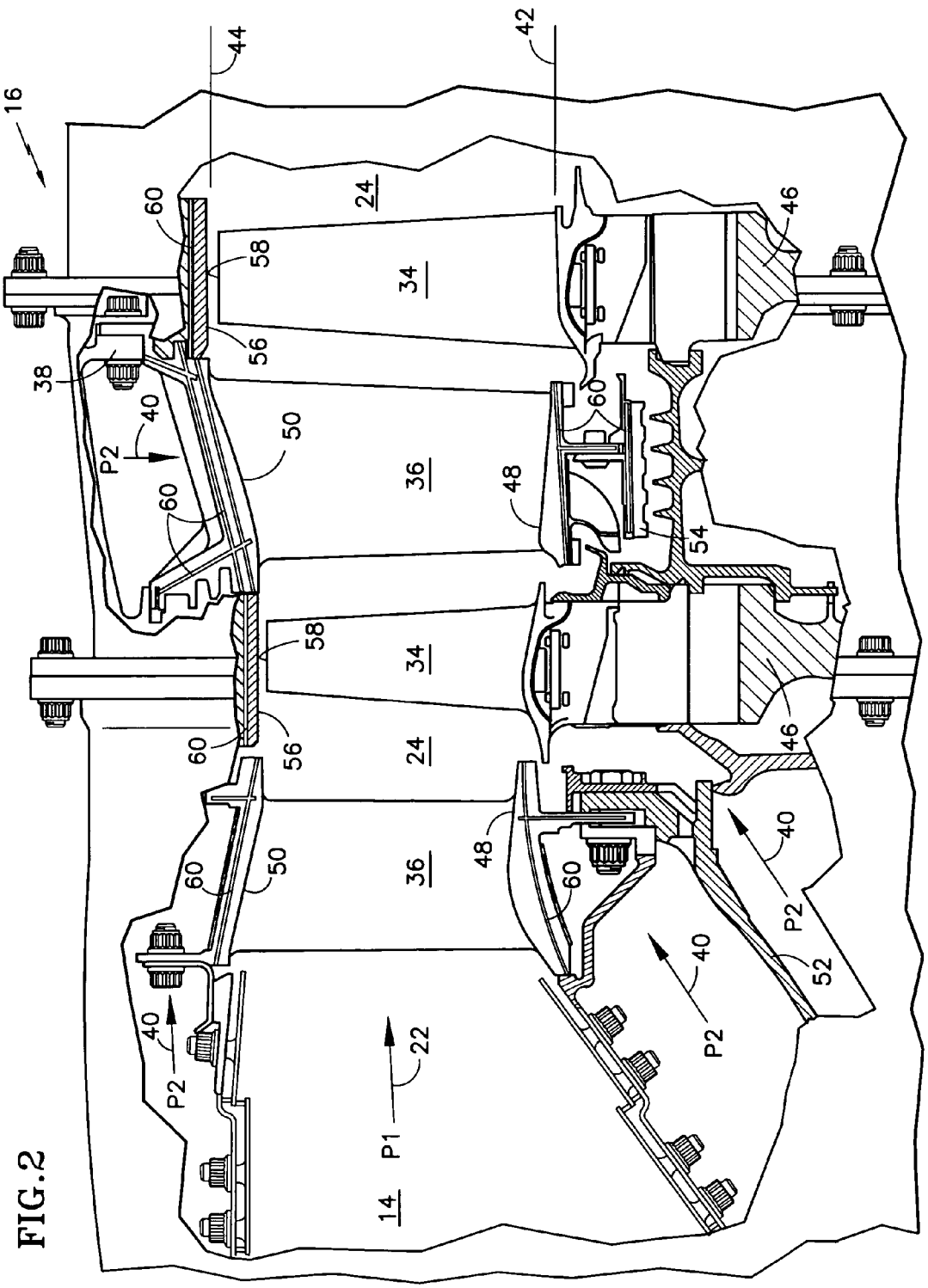
FIG. 2 is a partial sectional view of a high pressure turbine of the type used in the gas turbine engine of FIG. 1.

An exemplary turbine 16 of a gas turbine engine 10 is illustrated in FIG. 2. The high temperature combustion gases 22 discharge rearward from the combustor 14, at a pressure (P1), to an annular duct 24 defined by an inner periphery 42 and an outer periphery 44. Stationary vanes 36 guide the combustion gases 22 to rotating blades 34, extending radially outwardly from rotor disks 46. The vanes 36 span radially between inner 48 and outer 50 shrouds, which are suspended from an inner support 52 and/or outer casing 38 structures. Inner seals 54 restrict leakage of the combustion gases 22 from radially beneath the vanes 36 at the inner periphery 42. Outer seals 56 restrict leakage of the combustion gases 22 from radially above tips 58 of the blades 34 at the outer periphery 44.

Figure 1:
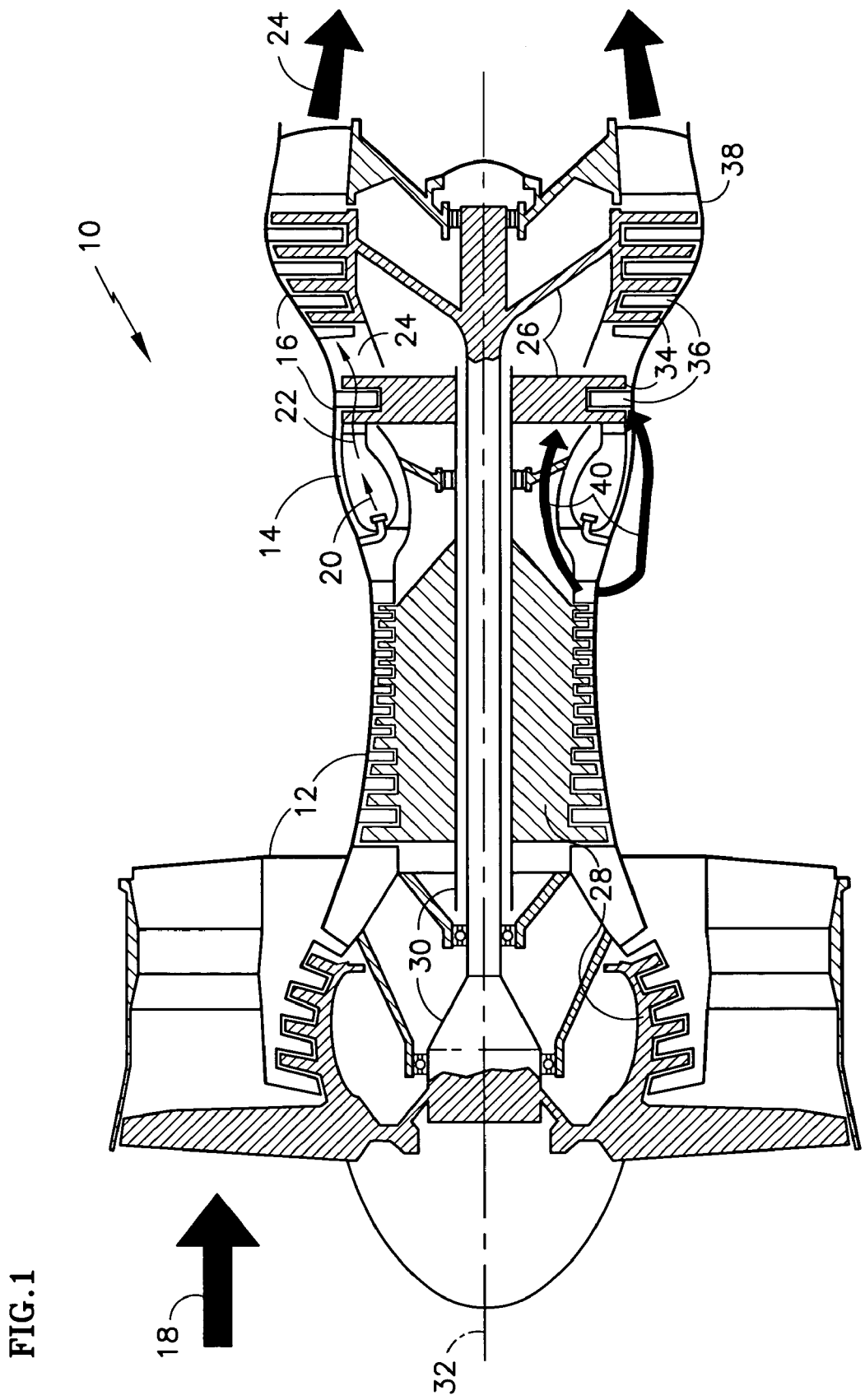
FIG. 1 is a simplified sectional view of an axial flow gas turbine engine.

Those skilled in the art will appreciate that each of the above-described components must be actively cooled, because the combustion gas 22 temperature typically exceeds the melting temperatures of the components' base alloy. For cooling purposes, relatively low temperature compressor air 40 is distributed from the compressor 12 (FIG. 1), at a pressure (P2), to the inner 42 and outer 44 duct peripheries and away from the annular duct 24. The compressor air 40 pressure (P2) is maintained at a higher level than the combustion gas 22 pressure (P1) in order to allow compressor air 40 at pressure (P2) to flow through turbine 16 components and provide active cooling, thus preventing overheating and premature oxidation of the components. Seals ensure a typical pressure ratio (P2:P1) of approximately 1.03, but certainly greater than 1.0, exists during all engine operating conditions.

Figure 3:
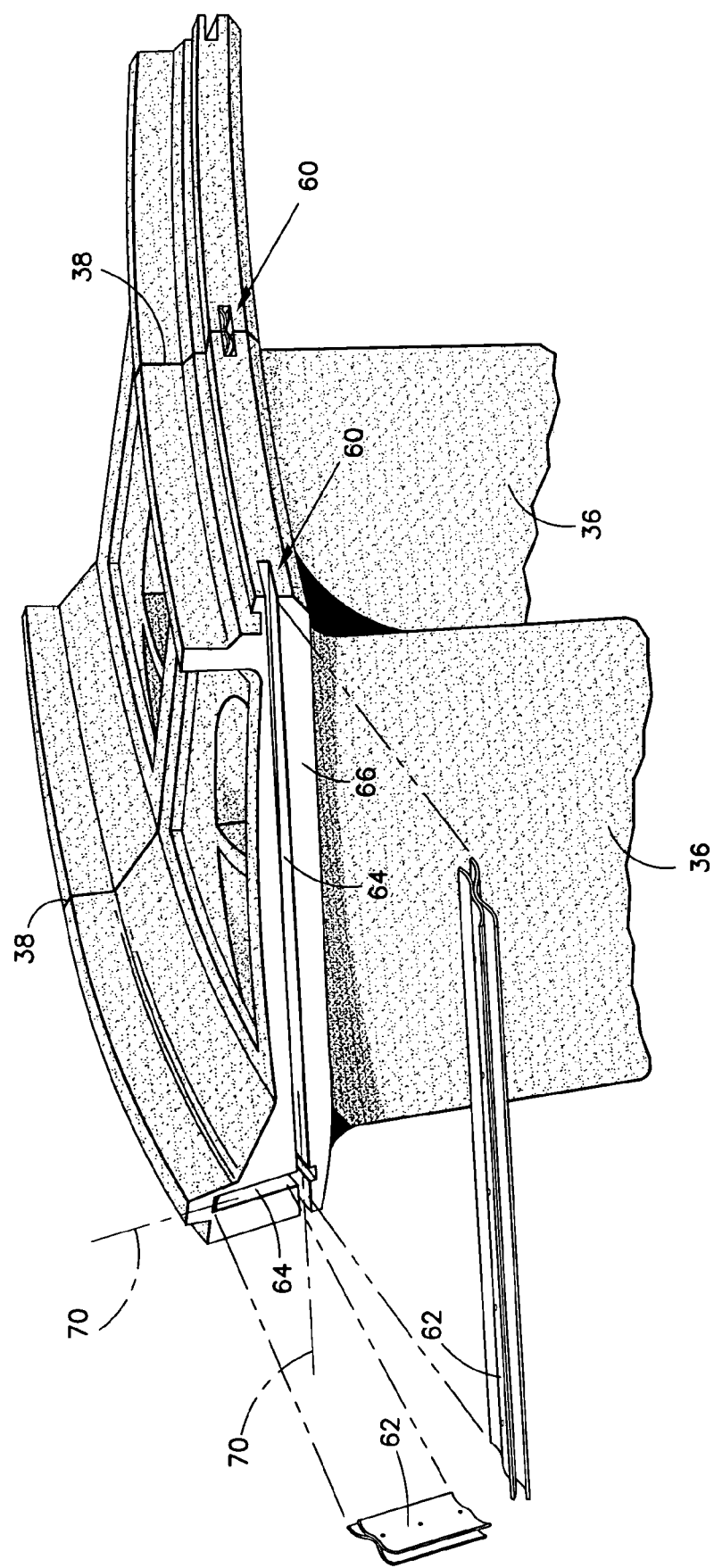
FIG. 3 is a partial isometric view of a segmented vane assembly of the type used in the high pressure turbine of FIG. 2.

Circumferentially segmented components such as the vanes 36, inner seals 54, outer seals 56 and the like, include a seal 60 between adjacent segments. As best illustrated in FIG. 3, a seal 60 in accordance with an embodiment of the invention contains bridging assemblies 62 that fit into axial and/or radial slots 64 machined into a mate face 66 of the vanes 36. With the vanes 36 installed, a gap 38 between the vanes 36 typically between 0.010 inch (0.254 mm) and 0.030 inch (0.762 mm), depending on the size of the components, accounts for thermal growth and reduces TMF. The slots 64 face one another and are open to the gap 68. The bridging assemblies 62 fit into the slots 64, while spanning across the gap 68. Although segmented vanes 36 are illustrated in the figure, other segmented component seals are similarly constructed.

Figure 4A:
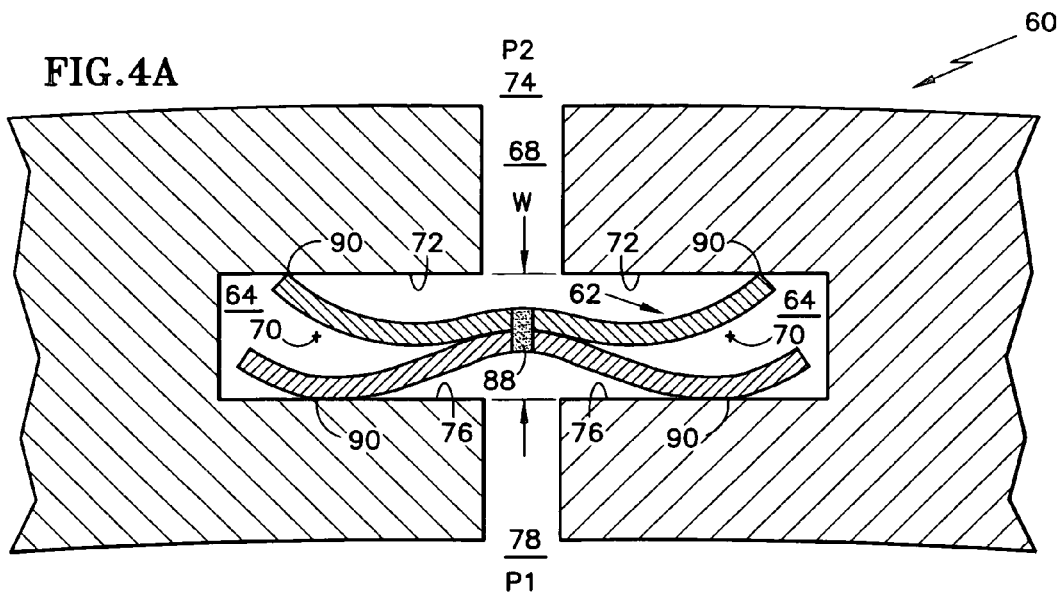
FIG. 4a is a simplified sectional view, taken perpendicular to the longitudinal axis of the slots, of a seal in accordance with an embodiment of the invention disposed between segmented components with aligned slots.
Figure 4B:
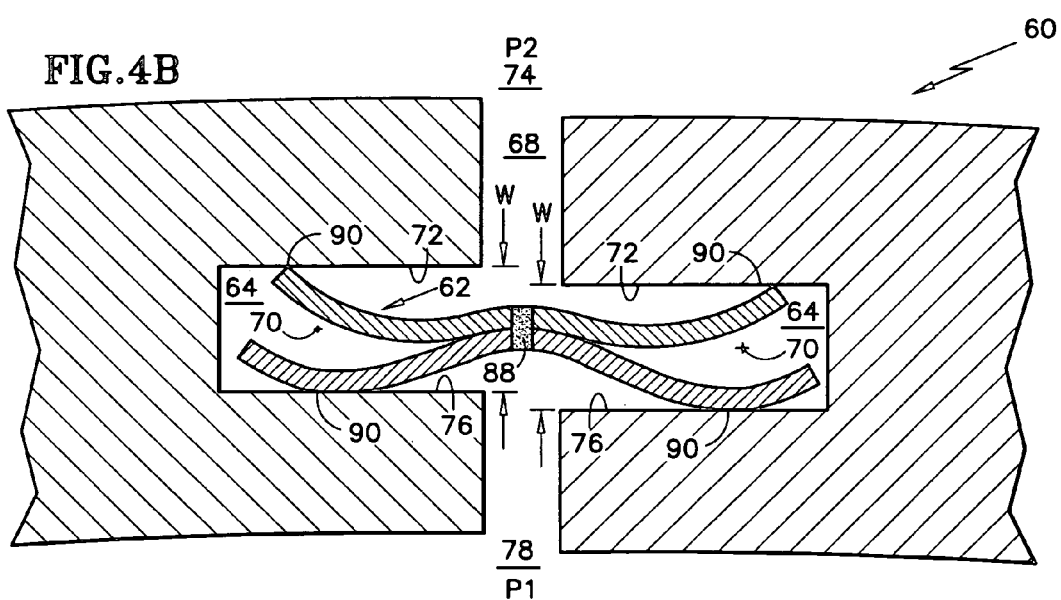
FIG. 4b is a simplified sectional view, taken perpendicular to the longitudinal axis of the slots, of a seal in accordance with an embodiment of the invention disposed between segmented components with misaligned slots.
Figure 4C:
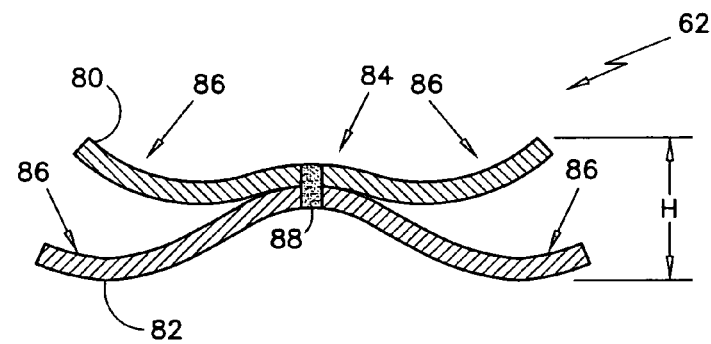
FIG. 4c is a simplified sectional view of a gap bridging assembly of FIGS. 4a and 4b prior to installation.

Further details of a segmented component seal 60 according to an embodiment of the invention are generally illustrated in FIGS. 4a-4c. Opposed slots 64 are open to a gap 68 and each contain a longitudinal axis 70, an upstream surface 72 proximate a first chamber 74 and a downstream surface 76 proximate a second chamber 78. Although the upstream 72 and downstream 76 surfaces are shown parallel in the illustration, they could also converge or diverge away from the gap 68. Typically, the slots 64 have an opening width (W) of between about 0.030 inch (0.762 mm) and 0.060 inch (1.524 mm). The slots 64 are preferably aligned as illustrated in FIG. 4a, but in some instances they may be slightly misaligned due to manufacturing tolerances as illustrated in FIG. 4b. Preferably, the slot axis 70 is linear, but a curvilinear slot axis 70 may also be used. The slots are produced by casting, abrasive machining, electrodischarge machining, or other suitable means.

The bridging assembly 62 comprises first 80 and second 82 bridging elements that fit into the slots 64 and contain a sectional profile, transverse to the longitudinal slot axis 64 that is wave shaped. A central crest portion 84 is disposed between two trough portions 86 at the profile ends. The bridging elements 80, 82 nest about their crest portions 84 and may be affixed to one another via a joint 88 by any suitable process such as, conventional welding, resistance welding, brazing or the like. By affixing the bridging elements 80, 82 together, assembly and disassembly are simplified, but may still be accomplished without affixing. The troughs 86 of the first 80 and second 82 bridging elements are sprung apart and do not nest together.

As may best be seen in FIG. 4C, a free height (H) of the uninstalled bridging elements 80, 82 is slightly larger than the opening width (W) of the slot 64. Preferably, the free height (H) is between 0.005 inch (0.127 mm) and 0.020 inch (0.508 mm) larger than the opening width (W). These dimensions are exemplary only and the actual sizes may vary for each specific application. The bridging elements 80, 82 are made of a material with suitable low temperature ductility and high temperature strength. Preferably, a Nickel or Cobalt based alloy strip approximately 0.010 inch (0.254 mm) thick is used. For lower temperature applications such as in the compressor, lower temperature materials may be used. Stamping, progressive rolling or other suitable forming process may be used to form the profile of the strip.

Since the free height (H) is greater than the opening width (W), the trough portions 86 are compressed together slightly and resiliently sprung into the slots 64 during assembly. The interference fit between the bridging elements 80, 82 and the upstream 80 and downstream 82 surfaces creates four independent leakage restrictions 90. The multiple restrictions 90 significantly reduce leakage from the first chamber 74 to the second chamber 78. As may also be seen in FIG. 4B, the multiple restrictions 90 remain intact, even if the slots 64 are slightly misaligned. Although the wave shaped profile of the bridging elements 80, 82 creates constant contact with the slots 64 despite the assembly direction, it is preferable to install the crest portions 84 so they rise in the direction of the higher pressure first chamber 74.

While the present invention has been described in the context of specific embodiments thereof, other alternatives, modifications and variations will become apparent to those skilled in the art having read the foregoing description. Accordingly, it is intended to embrace those alternatives, modifications and variations as fall within the broad scope of the appended claims.

What is claimed is:

1. A seal for restricting leakage of a fluid from a first chamber, through a gap between two spaced components, to a second chamber, comprising:
    a slot in each of the components, wherein the slots are open to the gap and each slot contains a longitudinal axis;
    a bridging assembly containing a first and a second bridging element, wherein said elements each contain a sectional profile, transverse to the longitudinal slot axis, that is wave shaped and includes a crest portion disposed between two trough portions, and wherein the crest portion of the first bridging element nests together with the crest portion of the second bridging element and the trough portions of the first bridging element are sprung apart from the trough portions of the second bridging element; and wherein the bridging assembly spans between the two components with the trough portions being disposed in the slots and the crest portions being disposed in the gap.

2. The seal of claim 1 wherein each slot contains an upstream surface proximate the first chamber and a downstream surface proximate the second chamber, and the first bridging element contacts the upstream surfaces and the second bridging element contacts the downstream surfaces.

3. The seal of claim 2 wherein the trough portions are resiliently sprung into the slots, forming an interference fit between the bridging elements and the upstream and downstream surfaces.

4. The seal of claim 3 wherein the crest portions rise toward the first chamber.

5. The seal of claim 1 wherein said first and second bridging elements are affixed to one another at the crest portions.

6. The seal of claim 5 wherein the first and second bridging elements are affixed at said crest portions by welding.

7. The seal of claim 1 wherein the bridging elements are made of a nickel based alloy strip.

8. The seal of claim 1 wherein the longitudinal axis of each slot is linear.

9. The seal of claim 1 wherein the two components are turbine vanes.

10. The seal of claim 1 wherein the fluid is compressor air.

11. A gap bridging assembly comprising:

a first and a second resilient element, wherein said resilient elements each contain a sectional profile, transverse to a longitudinal assembly axis, that is wave shaped and includes a central, crest portion disposed between two end, trough portions; and wherein the crest portions of the first and the second resilient elements nest together and the trough portions of the first resilient element are sprung apart from the trough portions of the second resilient element.

12. The gap bridging assembly of claim 11 wherein the first and second resilient elements are affixed to one another at said crest portions.

13. The gap bridging assembly of claim 12 wherein the first and second resilient elements are affixed by a weld joint.

14. The gap bridging assembly of claim 11 wherein the resilient elements are made of a nickel based alloy strip.

* * * * *

UNITED STATES PATENT AND TRADEMARK OFFICE
CERTIFICATE OF CORRECTION

PATENT NO. : 7,316,402 B2  Page 1 of 1
APPLICATION NO. : 11/371882
DATED : January 8, 2008
INVENTOR(S) : Corneil Paauwe It is certified that error appears in the above-identified patent and that said Letters Patent is hereby corrected as shown below:

Title Page, Item (75) Inventors:
Inventor name appears "Comeil Paauwe", should read --Corneil Paauwe--.

Signed and Sealed this

Thirteenth Day of May, 2008

JON W. DUDAS
*Director of the United States Patent and Trademark Office*